United States Patent [19]
Heembrock

[11] Patent Number: 5,853,127
[45] Date of Patent: Dec. 29, 1998

[54] HIGH PRESSURE WASHING DEVICE

[76] Inventor: Tony Heembrock, 2430 Delzotto Avenue, Gloucester, Ontario, Canada, K1T 3V7

[21] Appl. No.: 866,096

[22] Filed: May 30, 1997

[51] Int. Cl.$^6$ ........................................................ B05B 3/02
[52] U.S. Cl. ........................ 239/227; 239/587.5; 134/172; 134/123
[58] Field of Search ................................ 239/227, 587.5; 134/167 R, 172, 123

[56] References Cited

U.S. PATENT DOCUMENTS 5,188,293   2/1993   Burton .................................... 239/227

FOREIGN PATENT DOCUMENTS 2021683   8/1995   Canada .

OTHER PUBLICATIONS

PDQ Manufacturing, Inc., Brochure for "Carefree™ Wheel Bright™ On Line Cleaning System" 1988.
PDQ Manufacturing, Inc., Brochure for "Carefree™ Gatling Gunner™" 1990.
Belanger, Inc., Brochure for "The Belanger Wheel Jet™", Date Unknown.

*Primary Examiner*—Andres Kashnikow
*Assistant Examiner*—David Deal

[57] ABSTRACT

A high pressure washing device is provided which is suited for high pressure cleaning of vehicles and, in particular, the highly creviced or inaccessible surfaces of that vehicle including the vehicle front and rear bumper areas, rocker panel areas and the wheels. The invention provides a cleaning system having the advantages of a rotary and fixed nozzle system which provides maximum cleaning strength and coverage through reciprocal oscillation of a nozzle system while also system which rotates the nozzles. Still further, the device may rotate about a third access to track a vehicle in an automated car wash.

16 Claims, 4 Drawing Sheets

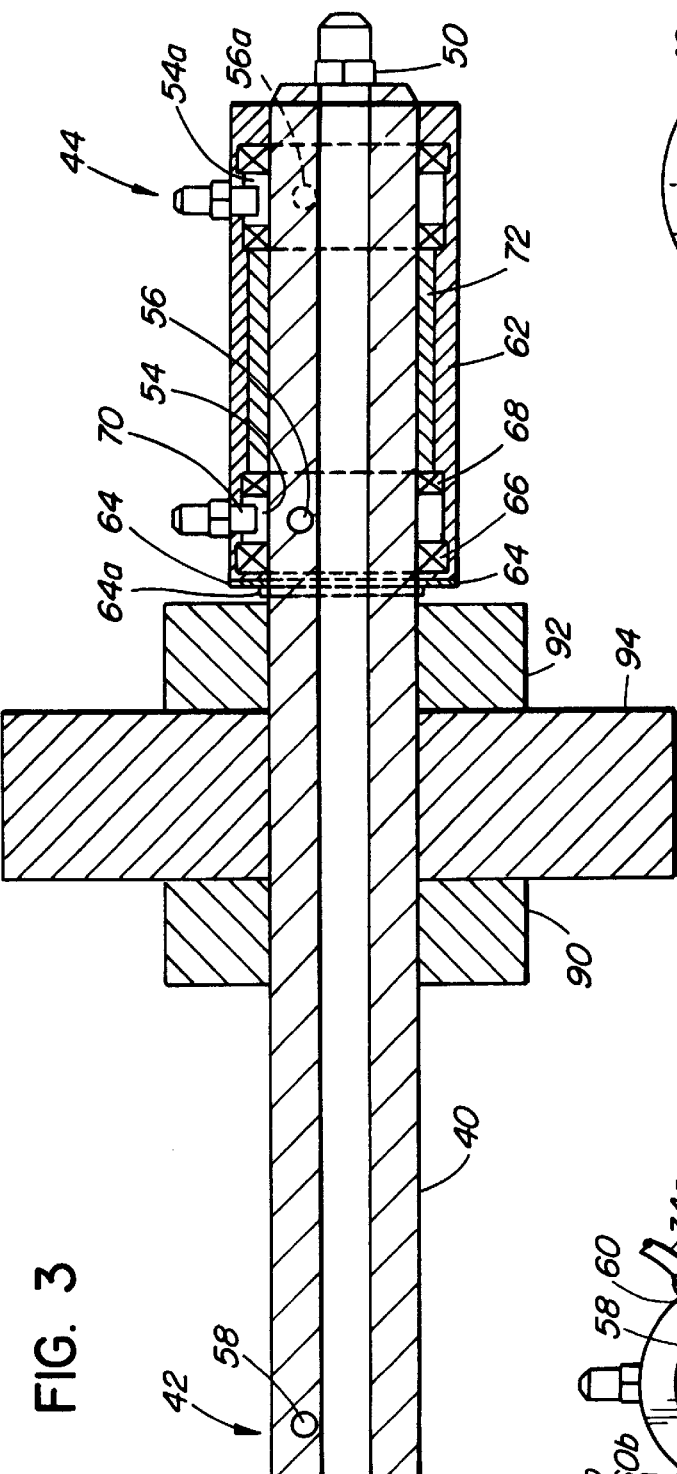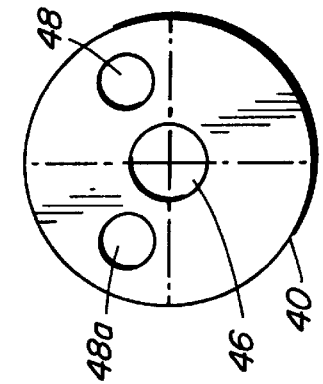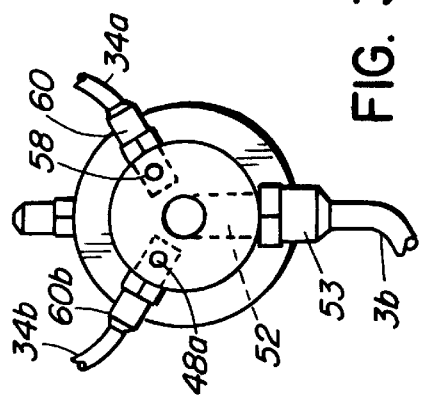

HIGH PRESSURE WASHING DEVICE

FIELD OF THE INVENTION

The present invention relates to a high pressure washing device particularly suited for high pressure cleaning of vehicles. The device provides a high pressure fluid spray enabling effective cleaning of narrow crevices particularly those found on alloy wheels of vehicles.

BACKGROUND OF THE INVENTION

In the car wash industry, existing machines used in cleaning the outer surfaces on an automobile do not address many of the problems experienced by car wash operators. In particular, as a result of the ever changing shapes of new cars, existing washing machinery is often not adaptable to the present design trends and shapes of newer vehicles often resulting in inefficient or ineffective cleaning of a vehicle.

In response to changes in the design and shape of vehicles, manufacturers have developed highly specific cleaning equipment to clean specific components of a vehicle. For example, highly specific brush systems have been developed to address the specific design trends or modifications introduced to many vehicles, such as alloy wheels, running boards, air dams etc.

A specific example of such a trend was the replacement of white wall tires with black wall tires, wherein the black wall tires are often mounted on ornamental rims rather than traditional rims with smooth hubcaps. This design modification or trend has resulted in rims which are often harder to clean by virtue of their shape and which also may be subject to an increased build-up of brake dust and pollution which further contributes to an increased difficulty in keeping these surfaces clean. In response to such a trend, various products have been brought to the market in an attempt to effectively clean these specific surfaces.

For example, in the case of alloy rims, the use of strong chemicals to clean the surfaces of these wheels has been utilized. The disadvantage of chemicals, however, is that they often result in staining or corrosion damage to the rims. Furthermore, brush systems which may have been useful in cleaning tire surfaces, when applied to an alloy rim may have resulted in damage to the alloy wheels.

Still further, other instances where brushes were used to clean tire surfaces, such brush systems may have resulted in damage to the running boards on a vehicle thus requiring an operator to manually retract brushes if a vehicle with running boards is passing through a car wash which is clearly unsatisfactory in the operation of an automated washing system. Still further, and with respect to running boards, brush systems developed specifically to clean running boards have often produced ineffective results.

In response to the deficiencies of particular brush systems, high pressure spraying systems have been employed to clean the running boards. Generally, however, these have not been particularly effective in properly cleaning the upper surfaces of the running boards on many vehicles.

Still further, other areas of vehicles have become or remain difficult to clean with existing systems. Examples or these areas include the rocker panel areas of a vehicle, the areas under the doors in the case of more streamlined shapes of newer vehicles and the front and rear of cars having molded plastic air dams under license plates etc. The main problem in cleaning these areas with brush systems is that brushes, generally, cannot gain excess into the lower areas of these vehicles, have a tendency to bend license plates and/or interfere with rear wiper systems on the rear windows of a vehicle.

Accordingly, there has been a tendency to move away from brush type cleaning systems because of the ineffective cleaning capabilities and/or the likelihood for damage that such systems may impart to a vehicle. However, hereinbefore high pressure washing devices have not provided effective cleaning for all types of vehicles.

For example, a high pressure water driven rotary device as developed by Mozmatic, uses a centre swivel and four zero degree nozzles. The nozzles are attached to the centre body of the device and are each six to twelve inches long. The nozzles are faced on a 30° angle and high pressure water entering the swivel exits through the four nozzles causing the unit to rotate similar to a wand sprinkler. Generally, this type of water spraying unit provides poor cleaning as the majority of the kinetic energy of the outgoing water is used to drive the unit rather than clean the vehicle. Furthermore, the angle at which the high pressure water hits the vehicle further reduces its effect. Still further, as the four nozzles spray water in a circular motion, the impact impression or pattern is generally a hollow circle or donut shape often resulting in an uncleaned area on the surface of the vehicle.

Another example of a past device is a high pressure fixed nozzle device. These devices primarily use a series of nozzles fixed along a pipe wherein the spray is directed towards the vehicle. While such a system of fixed sprayers has an increased impact force on the vehicle, as a result of the nozzles being fixed and the use of 15° fan nozzles, the cleaning impact is significantly reduced. Furthermore, the major drawback of a fixed nozzle system is that it cannot get into all the small areas of a mag or alloy wheel and particularly, fixed nozzle systems have difficulty in entering the complex honeycombed structure of a wheel having many crevices which would require water to strike the surface from many directions within a short period of time.

A still further device is a high pressure motor driven device. These devices primarily use a series of nozzles fixed along a pipe that is rotated and the spray is projected at the vehicle. This type of system improves the impact pressure on the vehicle compared to a rotary device because a motor is used to drive the device. These devices generally use a number of 0° nozzles which are rotated while the high pressure water is being discharged. By rotating such a device at about 80 rpm, the plurality of 0° nozzles behave like one larger nozzle. Thus, while this design offers more cleaning through greater impact strength, a similar problem exists with the impact pattern created by such a device, wherein a ringed pattern is created. Furthermore, the water is discharged out from a centre point along an angled pipe leading to a diminished cleaning force as the water radiates from the centre point. Furthermore, the design of this system has often lead to premature system failure as the rotating shaft of the motor supports the weight and load of the coupling, swivel, and water pipe and nozzles of the system. An example of such a system is disclosed in U.S. Pat. No. 5,188,293.

Still further, the nozzles of such a system must be aimed exactly so as to avoid stripping problems which may result from the use of 0° nozzles. The body area covered by a cluster of 0° nozzles is a small area with a cleaning force concentrated along the outside edges. Accordingly, an object within the centre of the spray pattern will experience very little cleaning at this position.

Still further, the combination of an 80 rpm rotation speed and the travel of a vehicle along a conveyor belt generally means that this system does not provide sufficient overlap to effectively clean the vehicle surfaces when a vehicle is traveling along the conveyor at the speed of a typical commercial operation. Most importantly, however, the angle of the nozzles is often incapable of reaching the highly creviced surfaces of many alloy wheels.

Accordingly, there has been a need to develop a high pressure washing system in which high pressure and effective cleaning is realized along the outer surfaces of a vehicle and in particular, the highly creviced or inaccessible surfaces of that vehicle including the vehicle front bumper areas, rocker panel areas, the wheels including the highly creviced surfaces of many alloy wheels and the rear bumper areas. Still further, it would be preferred that such a device would be capable of facing the front of the vehicle and follow specific areas of the vehicle such as the wheels or front or rear bumper areas of the vehicle.

Accordingly, in order to address the problems which are inherent in either a straight pipe or rotary cleaning system, applicant has developed a cleaning system which provides both the advantages of a rotary and fixed nozzle system which provides maximum cleaning strength and coverage through reciprocal oscillation of the nozzle system while also providing a rotary system. Such a system has not hereinbefore been disclosed.

SUMMARY OF THE INVENTION

In accordance with the invention, a high pressure washing device is provided comprising:

a plurality of outwardly projecting fluid delivery nozzles on a delivery head, the delivery head having a longitudinal axis generally perpendicular to the fluid delivery nozzles;

longitudinal axis rotation means for rotating the fluid delivery nozzles about the longitudinal axis with a reciprocating motion;

second axis rotation means operatively connected to the delivery head, the second axis rotation means for rotating the delivery head about a second axis, the second axis generally perpendicular to the longitudinal axis of the delivery head;

means for delivering high pressure fluid to the fluid delivery nozzles through the second axis rotation means and the delivery head.

In further embodiments of the invention, the device further comprises third axis rotation means operatively connected to the second axis rotation means, the third axis rotation means for rotating the second axis rotation means about a third axis, the third axis perpendicular to the second axis. In a more specific embodiment, the third axis rotation means includes linear actuation means adapted to provide reciprocating rotational motion of the second axis rotation means about the third axis.

In another embodiment, the delivery head includes a tube having a medial plane generally perpendicular to the second axis and at least one fluid delivery nozzle is offset with respect to the medial plane. In a preferred embodiment, the offset with respect to the medial plane is less than 10 degrees.

In another embodiment, at least one fluid delivery nozzle includes an extension member perpendicular to a nozzle member. In this embodiment, it is preferred that the nozzle member is further rotationally offset with respect to second axis at an angle less than 15 degrees.

In one embodiment, the longitudinal axis rotation means is a hydraulic air pressure actuation device having a range of motion of 15–90 degrees about the longitudinal axis.

In another embodiment, the second axis rotation means includes a fluid delivery shaft operatively connected to a second axis drive means, wherein the fluid delivery shaft includes a fluid delivery channel within the fluid delivery shaft for delivering fluid to the delivery head and may also include at least one air delivery passage within the fluid delivery shaft for providing compressed air to the delivery head.

It is preferred that the second axis rotation means and delivery head are counterbalanced with respect to bearings supporting the fluid delivery shaft.

In other embodiments, the invention may also include means for translational movement of the washing device.

In a specific embodiment, the invention provides a high pressure washing system comprising:

a plurality of outwardly projecting fluid delivery nozzles on a delivery head, the delivery head having a longitudinal axis generally perpendicular to the fluid delivery nozzles, the delivery head including hydraulic air pressure actuation means for rotating the fluid delivery nozzles about the longitudinal axis with a reciprocating motion;

second axis rotation means operatively connected to the delivery head for rotating the delivery head about a second axis, the second axis generally perpendicular to the longitudinal axis of the delivery head, the second axis rotation means including a fluid delivery shaft operatively connected to second axis drive means, wherein the fluid delivery shaft includes a fluid delivery channel within the fluid delivery shaft for delivering fluid to the delivery head, the fluid delivery shaft also including at least one air delivery passage within the fluid delivery shaft for providing compressed air to the delivery head;

third axis rotation means operatively connected to the second axis rotation means, the third axis rotation means for rotating the second axis rotation means about a third axis, the third axis perpendicular to the second axis.

BRIEF DESCRIPTION OF THE DRAWINGS

These and other features of the invention will be more apparent from the following description in which reference is made to the appended drawings wherein:

FIG. 3 is a side view of the rotating fluid delivery shaft of the high pressure washing device in accordance with the invention;

FIG. 3a is an end view of the rotating fluid delivery shaft of the high pressure washing device in accordance with the invention;

FIG. 4 is a cross-sectional view of the rotating fluid delivery shaft of the high pressure washing device in accordance with the invention;

DETAILED DESCRIPTION OF THE INVENTION

In accordance with the invention and with reference to FIGS. 1–4, a high pressure washing device 10 is described.

Figure 1:
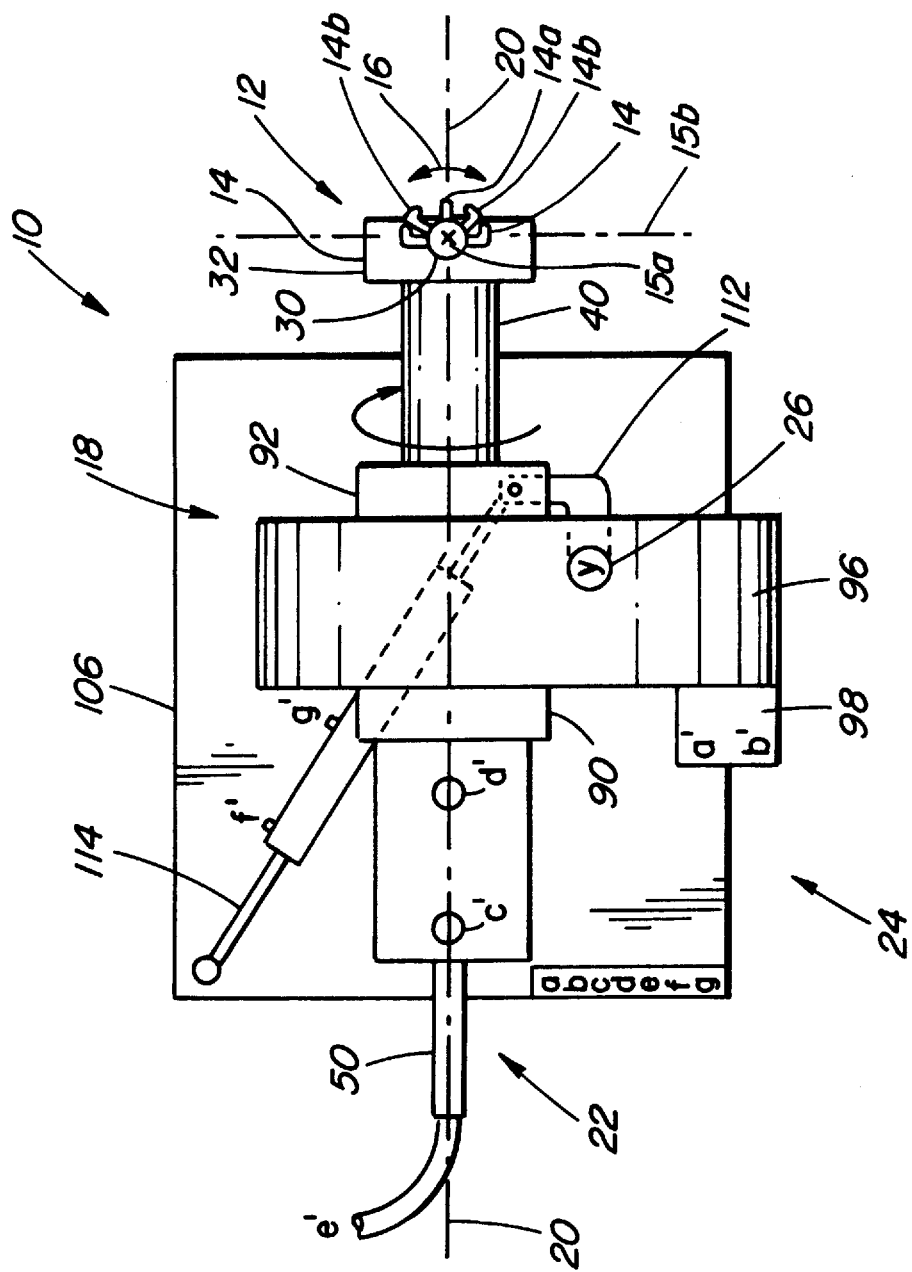
FIG. 1 is a schematic top view of the high pressure washing device in accordance with the invention.
Figure 1A:
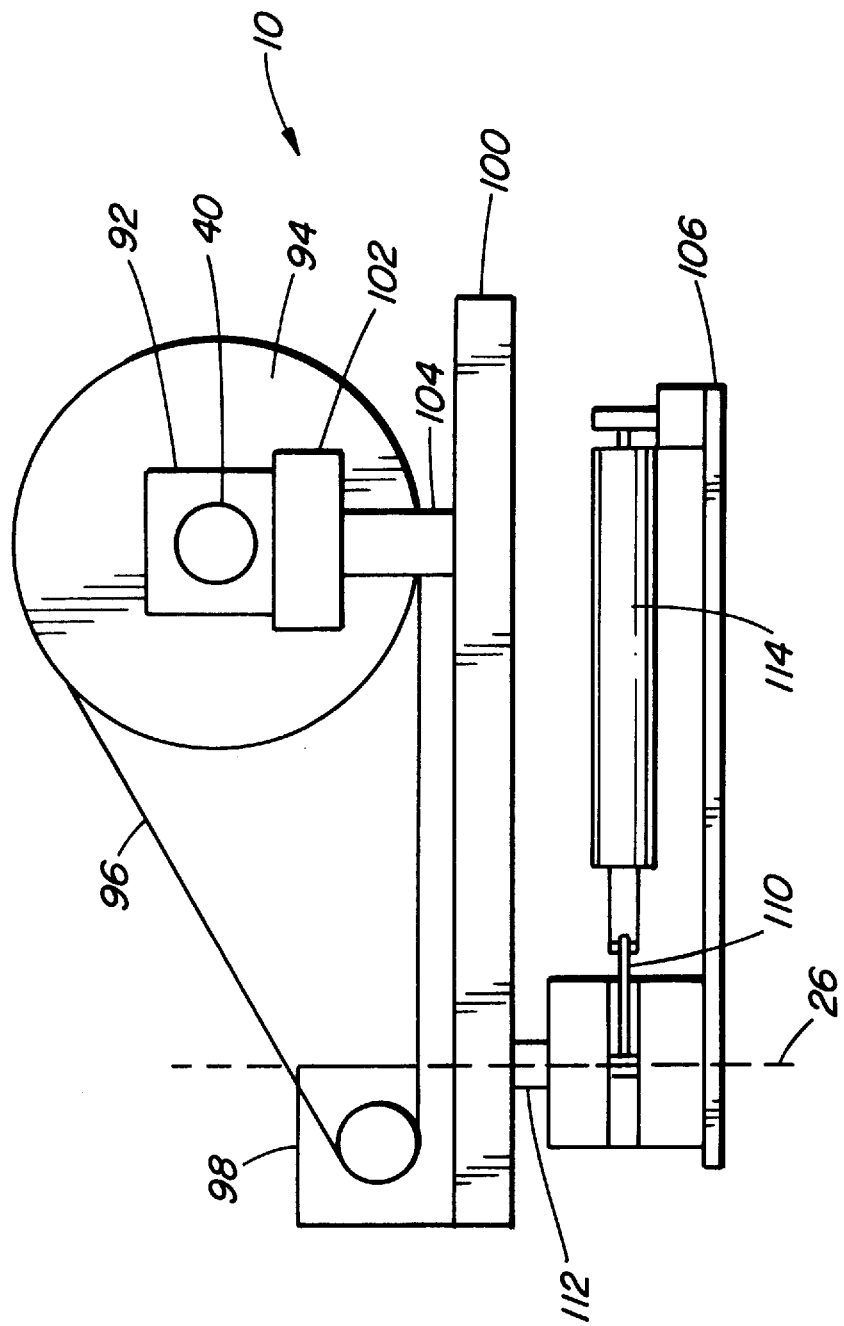
FIG. 1a is a schematic side view of the high pressure washing device in accordance with the invention with the delivery head removed.

Referring to FIGS. 1 and 1a, the washing device 10 is shown to generally include a delivery head 12 having a plurality of outwardly projecting nozzles 14 distributed along and about a longitudinal axis 15a (the longitudinal axis designated x and shown as perpendicular to the plane of the paper), actuation means for reciprocating rotation of the delivery head 12 about the longitudinal axis (as depicted by double-headed arrow 16), second axis rotation means 18 for rotation of the delivery head about a second axis, the second axis generally perpendicular to the longitudinal axis (the second axis depicted as line 20) and a fluid delivery system for delivering fluids 22 to the nozzles 14 through the second axis rotation means 18. Still further, the washing device 10 may also include a third axis rotation means for rotation of the device 10 about a third axis 26 (the third axis designated y and shown as perpendicular to the plane of the paper).

In operation, the device 10 generally enables a high pressure fluid to be expelled from the nozzles 14 while the nozzles 14 are simultaneously reciprocating about the longitudinal axis 14, rotating about the second axis 20 and optionally reciprocating about the third axis 26.

Figure 2:
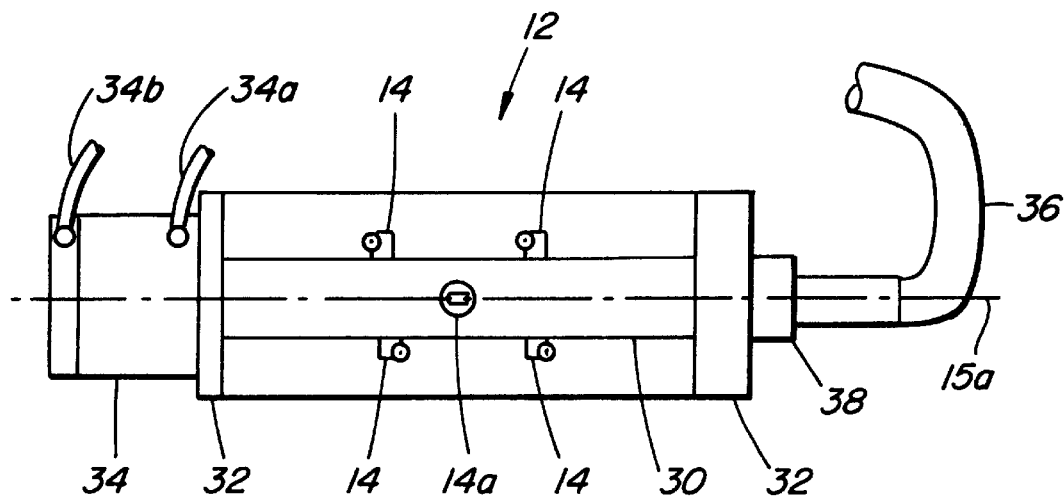
FIG. 2 is a schematic front view of the delivery head of the high pressure washing device in accordance with the invention.
Figure 2A:
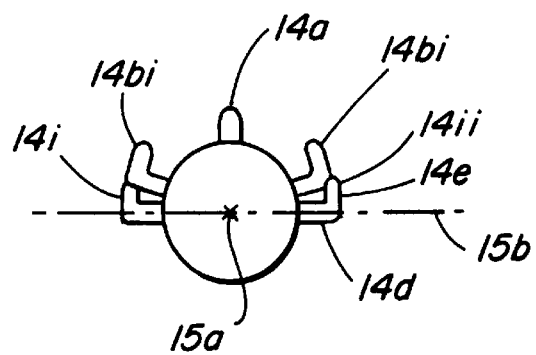
FIG. 2a is a schematic end view of the delivery head of the high pressure washing device in accordance with the invention.

With reference to FIGS. 1 and 2, the delivery head 12 is shown to include a fluid shaft 30 mounted in a bracket 32 attached to shaft 40 with nozzles 14 extending outwardly from the fluid shaft 30. As shown, the fluid shaft 30 is shown to include 5 nozzles, each of which are generally oriented away from the delivery head 12 in a direction generally perpendicular to the longitudinal axis 15a. As indicated, the delivery head 30 preferably includes 5 nozzles, 4 of which are right angled nozzles having an extension member 14d and nozzle member 14e and a fifth nozzle 14a which is centrally located and generally coincident with the second axis.

As can be seen from FIG. 1, a medial plane 15b through the fluid shaft 30 coincident with the longitudinal axis 15a and perpendicular to the plane of the paper in FIG. 1 is defined. Preferably, 2 of the 4 right angled fluid delivery nozzles 14 are generally centered with respect to the medial plane 15b whereas 2 of the 4 right angled fluid delivery nozzles 14b are offset with respect to medial plane 15b of the fluid shaft 30. In a preferred embodiment, the offset of the nozzles 14 with respect to the medial plane 15b is less than 10 degrees so that fluid spray from each individual nozzle 14 is generally not parallel with respect to the second axis. For example, a further degree of non-parallelness is achieved between nozzle pairs 14i and 14ii and 14bi and 14bii respectively by further offsetting each nozzle 14i, 14ii, 14bi and 14bii with respect to the second axis 20 by 10–15 degrees.

The central nozzle 14a is preferably parallel to and coincident with the second axis 20.

The nozzle head on each nozzle 14 preferably provides a spray fan of 5–15 degrees.

As indicated, the fluid shaft 30 is mounted in a supporting bracket 32, the first end of the fluid shaft 30 connected to an actuation means 34 for rotating the fluid shaft 30 about the longitudinal axis 14a. The second end is mounted in a supporting block enabling rotation of the fluid shaft 30 about the longitudinal axis. Extending outwardly from the second end of the fluid shaft 30 is a pressure hose 36 for delivery of pressurized fluid to the fluid shaft 30 and nozzles 14. The coupling 38 between the pressure hose 36 and fluid shaft 30 enables rotation of the fluid shaft 30 with respect to the pressure hose 36. In a preferred embodiment, the pressure hose 36 is a rigid stainless steel tube.

The actuation device 34 is preferably an air hydraulic unit mounted at the first end of the fluid shaft 30 on the supporting bracket 32 which is directly coupled to the fluid shaft 30. The actuation device enables reciprocal motion of the fluid shaft 30 about the longitudinal axis 15a. Preferably, the actuation device 34 provides 15–90 degree reciprocating motion about the longitudinal axis 15a. Air pressure for the air hydraulic unit is received from the fluid delivery shaft 40 described in greater detail below.

In order to provide rotation of the delivery head 12 about the second axis and simultaneously enable high pressure fluid delivery to the nozzles as well as air pressure to the actuation device 34, the rotating fluid delivery shaft 40 carries and couples high pressure fluid to the fluid shaft 30 as well as air pressure for the actuation device 34. While the description which follows refers to air pressure as being required for the actuation device 34, it is understood that for certain applications, actuation device 34 may be an oil hydraulic motor and, accordingly, require oil pressure for actuation.

With reference to FIG. 3, the rotating fluid delivery shaft 40 is shown to include a first end 42 for coupling to the delivery head 30 and a second end 42 for coupling to a pressurized fluid and air supply. The fluid delivery shaft 40 includes at least two internal channels as shown in FIG. 4, a high pressure fluid channel 46 and at least one air channel 48 and/or 48a. Preferably, the high pressure fluid channel 46 is centrally located coincident with the longitudinal axis of the fluid delivery shaft 40.

In order to couple the flow of high pressure fluid from a source external to the device 10 to the delivery head 12, fluid enters the second end 44 of the fluid delivery shaft 40 from an external source through a swivel coupling 50. High pressure fluid flows through the high pressure fluid channel 46 to the first end 42 of the fluid delivery shaft whereby it exits through exit channel 52 (FIG. 3a) connected via coupling 53 to pressure hose 36 as shown in FIG. 2.

In order to couple the flow of air required to power the actuation device 34 from a source external to the device 10 to the delivery head 12, air enters a sealed chamber 54 surrounding the fluid delivery shaft 40 and thereafter enters an intake channel 56 connected to the air channel 48. Air flows through the air channel 48 to the first end 42 of the fluid delivery shaft 40 whereby it exits through exit channel 52 connected via coupling 60 to air hose 34a connected to actuation device 34 as shown in FIG. 2. The sealed chamber 54 is formed between outer sleeve 62, end washers 64, first hydraulic seal 66 and second hydraulic seal 68 all of which surround fluid delivery shaft 40 and particularly intake 56 so as to form a sealed chamber. An intake channel 70 through outer sleeve 62 with coupling 72 allows connection of an external air pressure source to the device 10.

Similarly, if a second or further air or fluid passage is required from the second end 44 to the first end 42 of the fluid delivery shaft 40, further sealed chambers as described above may be incorporated around the fluid delivery shaft 40 with appropriate intake and exit ports provided with the fluid delivery shaft 40. Preferably, and as shown in FIG. 3, an inner sleeve 72 is provided to ensure appropriate separation between sealed chambers 54, 54a as well as an appropriate retaining washer or clip 64a to provide alignment of the sleeve assembly on the fluid delivery shaft 40.

The fluid delivery shaft 40 is mounted on bearings 90, 92 wherein the mass of the shaft 40 with delivery head 12 is balanced with respect to the sleeve assembly on the second end 44 of the shaft 40 and the bearings 90, 92 so as reduce or minimize loading on the bearings 90, 92. The bearings are preferably a suitable ultra high molecular weight TEFLON bearing to promote operational longevity in a humid environment.

The fluid delivery shaft 40 is made to rotate about the second axis by means of a drive system, preferably a cog 94, belt 96 and motor 98 system as shown in FIGS. 1, 1a and 3. It is also preferred that the speed of the drive system is fully adjustable so as to enable operation of the fluid delivery shaft at a variety of speeds. Still further, it is preferred that the drive system includes rubberized belts and cogs to facilitate operation of the system 10 in a highly humid environment.

In view of the humid operating environment of the device 10, the motor 98 is preferably an oil hydraulic motor. In an alternate embodiment, the motor 98 may be a water turbine motor which operates off the high pressure water supply which is used for providing high pressure water to the fluid delivery shaft 40.

As shown in FIGS. 1 and 1a, the fluid delivery shaft 40 and delivery head 12 may also be made to rotate about a third axis 26 to provide superior operator control during particular cleaning operations. In this embodiment, the fluid delivery shaft 40 and drive system is mounted on a support member 100 which in turn is adapted for pivotal movement about the third axis 26. As shown in FIG. 1a, the fluid delivery shaft 40 is supported on support member 100 through bearings 92, 94 and appropriate spacing blocks 102, 104 as appropriate to provide clearance for cog 96 above the support member 100.

The support member 100 is rotatable about a base 106 through cam arm 110 and third axis actuation means 114 operatively connected between the support member 100 and base member 106 through axle 112. It is preferred that the pivot point 26 and axle 112 are offset with respect to the second axis 20 so as to increase the range of rotation which may be achieved by the third axis actuation means 114 and cam arm linkage 110. An increased range of motion enhances the ability to track a moving vehicle on a conveyor and is particularly useful for cleaning the creviced surfaces of an alloy wheel. Furthermore, an increased range of motion enables an operator to vary the spray pattern on a vehicle by increasing or decreasing the striking angle through a greater range.

In further embodiments of the invention, the device 10 may be mounted on translational or rotational motion machines to further provide flexibility in the operation of the device 10 for tracking a moving object being cleaned or, alternatively, to increase the surface area covered by the device 10. For example, the support member 100 could be configured to an appropriate horizontal and/or vertical translational motion machine, to clean a larger area of a vehicle.

The device 10 is preferably constructed from corrosion resistant materials to promote product-life longevity and inhibit corrosion such as stainless steel and plastics.

Operation and Control

Generally, the device 10 is used to provide high pressure water cleaning of an object, such as a vehicle in a car wash, and in particular the wheels of a vehicle. Typically, a water pressure in the order of 1000 psi is utilized and is provided by a high pressure water pump (not shown). High pressure water is connected to the base 106 at e and connected via appropriate tubing (not shown) to the swivel coupling 50 (at e') whereby it passes through fluid channel 46 and through exit channel 52 to pressure hose 36 to fluid tube 30 whereupon it is expelled through nozzles 14.

Air pressure for actuation of the delivery head actuation means 34 is connected to the device 10 at c and d (FIG. 1) from an appropriate supply (not shown) and connected to c' and d' by appropriate tubing (not shown) whereupon it enters chambers 54 and 54a and entry ports 56 and 56a respectively. Passing through air channels 48 and 48a respectively, air exits the fluid delivery shaft 40 through exit channels 58 and 58a into pressure tubes 34a and 34b which are respectively connected to the delivery head actuation means 34 whereupon it is thereby used for actuation of the delivery head actuation means 34.

Oil pressure for actuation of the fluid delivery shaft motor 98 is connected to the device 10 at a and b (FIG. 1) from an appropriate supply (not shown) and connected to a' and b' by appropriate tubing (not shown) for actuation of the fluid delivery shaft motor 98.

Air pressure for actuation of the third axis actuation means 114 is connected to the device 10 at f and g (FIG. 1) from an appropriate supply (not shown) and connected to f' and g' by appropriate tubing (not shown) for actuation of the third axis actuation means 114.

The operational speeds of the various systems of the device 10 will depend upon the installation particulars. In a typical installation, the device will operate with a longitudinal axis rotation speed 142, a second axis rotation speed of 40–55 rpm and the third axis rotation speed determined by the relative speed that a vehicle may be passing through an automated car wash. In addition, third axis rotating speed may be directly controlled by the relative position of a vehicle on a moving track whereby mechanical detectors sense the position of a vehicle and a controlling computer orients the device on the basis of the detected position.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property or privilege is claimed are defined as follows:

1. A high pressure washing system comprising:
    a plurality of outwardly projecting fluid delivery nozzles on a delivery head, the delivery head having a longitudinal axis generally perpendicular to the fluid delivery nozzles;
    longitudinal axis rotation means for rotating the fluid delivery nozzles about the longitudinal axis with a reciprocating motion;
    second axis rotation means operatively connected to the delivery head, the second axis rotation means for rotating the delivery head about a second axis, the second axis generally perpendicular to the longitudinal axis of the delivery head;
    means for delivering high pressure fluid to the fluid delivery nozzles through the second axis rotation means and the delivery head.

2. The washing system as in claim 1 wherein the system further comprises third axis rotation means operatively connected to the second axis rotation means, the third axis rotation means for rotating the second axis rotation means about a third axis, the third axis perpendicular to the second axis.

3. The washing system as in claim 2 wherein the third axis rotation means includes linear actuation means adapted to provide reciprocating rotational motion of the second axis rotation means about the third axis.

4. The washing system as in claim 1 wherein the delivery head includes a tube having a medial plane generally perpendicular to the second axis and at least one fluid delivery nozzle is offset with respect to the medial plane.

5. The washing system as in claim 4 wherein the offset with respect to the medial plane is less than 10 degrees.

6. The washing system as in claim 4 wherein at least one fluid delivery nozzle includes an extension member and a nozzle member, the nozzle member perpendicular to the extension member and wherein the nozzle member is further rotationally offset with respect to second axis.

7. The washing system as in claim 6 wherein the rotational offset with respect to the second axis is less than 15 degrees.

8. The washing system as in claim 1 wherein the longitudinal axis rotation means is a hydraulic air pressure actuation device.

9. The washing system as in claim 1 wherein the delivery head has a range of motion of 15–90 degrees about the longitudinal axis.

10. The washing system as in claim 1 wherein the second axis rotation means includes a fluid delivery shaft operatively connected to second axis drive means, wherein the fluid delivery shaft includes a fluid delivery channel within the fluid delivery shaft for delivering fluid to the delivery head.

11. The washing system as in claim 1 wherein the fluid delivery shaft includes at least one air delivery passage within the fluid delivery shaft for providing compressed air to the delivery head.

12. The washing system as in claim 1 wherein the second axis rotation means and delivery head are counterbalanced with respect to bearings supporting the fluid delivery shaft.

13. The washing system as in claim 1 further comprising means for translational movement of the washing device.

14. A high pressure washing system comprising:

a plurality of outwardly projecting fluid delivery nozzles on a delivery head, the delivery head having a longitudinal axis generally perpendicular to the fluid delivery nozzles, the delivery head including hydraulic air pressure actuation means for rotating the fluid delivery nozzles about the longitudinal axis with a reciprocating motion;

second axis rotation means operatively connected to the delivery head for rotating the delivery head about a second axis, the second axis generally perpendicular to the longitudinal axis of the delivery head, the second axis rotation means including a fluid delivery shaft operatively connected to second axis drive means, wherein the fluid delivery shaft includes a fluid delivery channel within the fluid delivery shaft for delivering fluid to the delivery head, the fluid delivery shaft also including at least one air delivery passage within the fluid delivery shaft for providing compressed air to the delivery head;

third axis rotation means operatively connected to the second axis rotation means, the third axis rotation means for rotating the second axis rotation means about a third axis, the third axis perpendicular to the second axis.

15. The washing system as in claim 14 wherein the delivery head includes a tube having a medial plane generally perpendicular to the second axis and at least one fluid delivery nozzle is offset with respect to the medial plane.

16. The washing system as in claim 15 wherein the offset with respect to the medial plane is less than 10 degrees and wherein at least one fluid delivery nozzle includes an extension member and a nozzle member, the nozzle member perpendicular to the extension member and wherein the nozzle member is further rotationally offset with respect to second axis less than 15 degrees.

* * * * *